United States Patent [19]

Bridges

[11] Patent Number: 5,765,876
[45] Date of Patent: Jun. 16, 1998

| [54] | PIPE COUPLING REQUIRING LOW CLOSING FORCE |
|---|---|
| [76] | Inventor: Donald Y. Bridges, 3014 Creek Ct., Roswell, Ga. 30075 |
| [21] | Appl. No.: 562,620 |
| [22] | Filed: Nov. 24, 1995 |
| [51] | Int. Cl.⁶ .................................................. F16L 55/16 |
| [52] | U.S. Cl. ........................ 285/15; 285/373; 285/910 |
| [58] | Field of Search .................................. 285/373, 419, 285/910, 15; 138/99, 97; 277/9 |

[56] References Cited

U.S. PATENT DOCUMENTS

| 2,041,132 | 5/1936 | Johnson | 285/194 |
|---|---|---|---|
| 3,776,579 | 12/1973 | Gale | 285/233 |
| 3,877,733 | 4/1975 | Straub | 285/105 |
| 4,049,298 | 9/1977 | Foti | 285/373 X |
| 4,360,227 | 11/1982 | Bridges | 285/373 |
| 4,421,347 | 12/1983 | Kantor | 285/369 |
| 4,664,428 | 5/1987 | Bridges | 285/373 |
| 4,702,500 | 10/1987 | Thau, Jr. et al. | 285/112 |
| 4,807,912 | 2/1989 | Maier | 285/348 |
| 4,927,189 | 5/1990 | Burkit | 285/109 |
| 5,076,618 | 12/1991 | Bridges | 285/370 |
| 5,086,809 | 2/1992 | Bridges | 138/99 |
| 5,092,633 | 3/1992 | Burkit | 285/109 |
| 5,230,537 | 7/1993 | Newman | 285/112 |
| 5,249,829 | 10/1993 | Hendrickson | 285/112 |
| 5,280,969 | 1/1994 | Straub | 285/105 |
| 5,286,064 | 2/1994 | Bridges | 285/15 |
| 5,295,716 | 3/1994 | Bridges | 285/15 |
| 5,362,107 | 11/1994 | Bridges | 285/15 |
| 5,383,496 | 1/1995 | Bridges et al. | 138/99 |

OTHER PUBLICATIONS

Brico Product Catalogue excerpts pp. FE8 and EE3. (avail. more than 1 year before filing).

Primary Examiner—Randolph A. Reese
Assistant Examiner—Heather Shackelford
Attorney, Agent, or Firm—Jones & Askew

[57] ABSTRACT

A coupling for sealing a leak location in a pipe or pipeline by compressing against the pipe or pipeline a pair of annular gasket members fitted about the pipe or pipeline on opposite sides of the leak location comprising a first axial sealing pad disposed in a recess in an annular coupling member and a second axial sealing pad attached to a sealing plate which extends across an axial split in the coupling. The first and second axial sealing pads form an axial seal when the coupling is closed about a pipe or pipeline for preventing passage of fluid from between the annular gasket members to the outer surface of the coupling member through the axial split. The annular coupling member of the coupling has an axial split defined by first and second axial edges and comprises a first portion extending from the first axial edge to an axial shoulder which extends outwardly to a second portion. The second portion extends from the axial shoulder to a second axial edge to form the inwardly facing recess in which the first axial sealing pad is disposed.

15 Claims, 5 Drawing Sheets

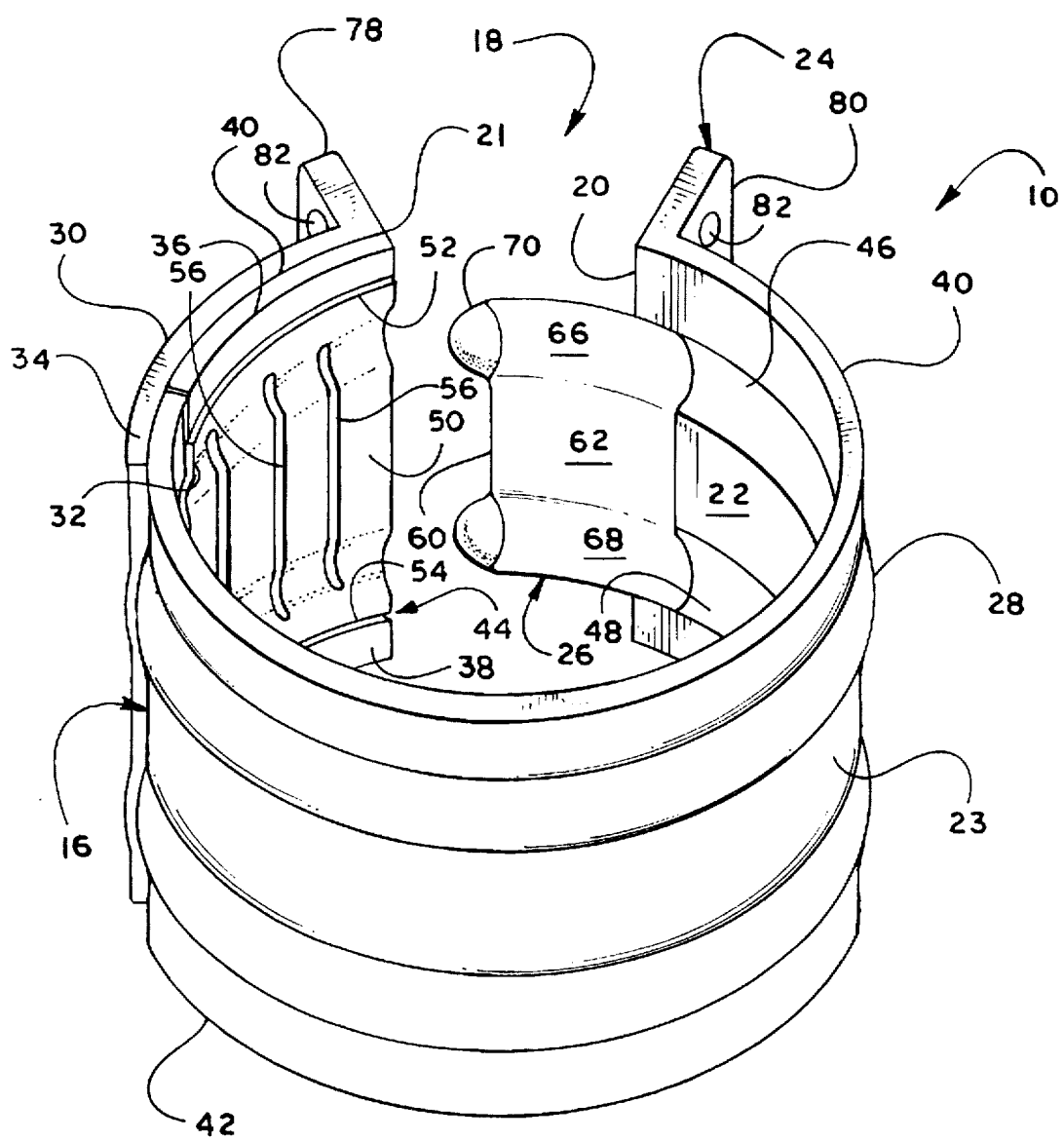
Fig_1

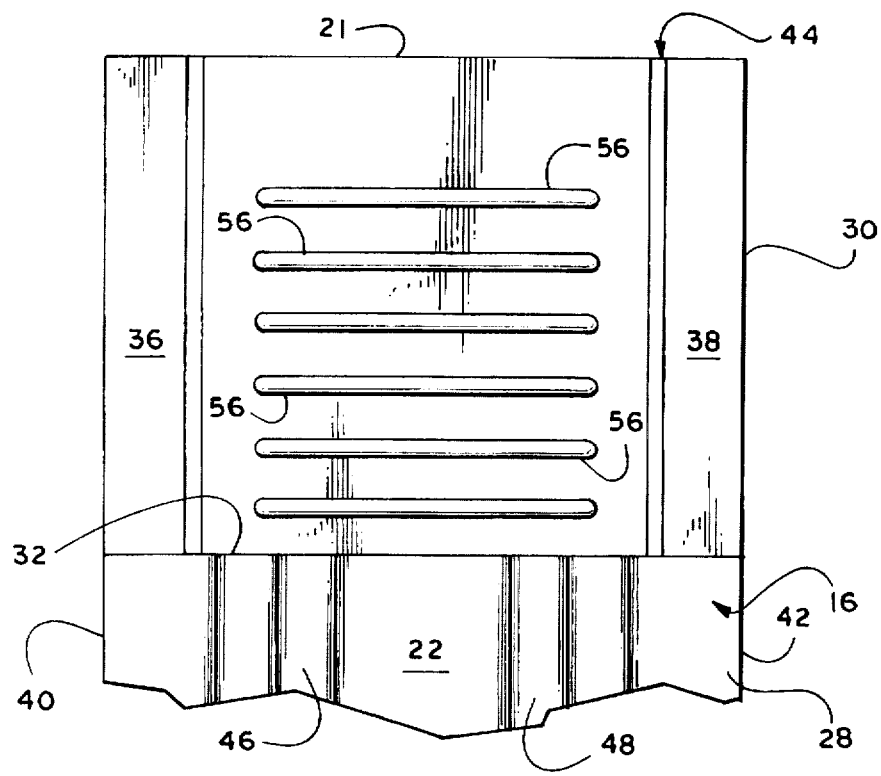
Fig_2
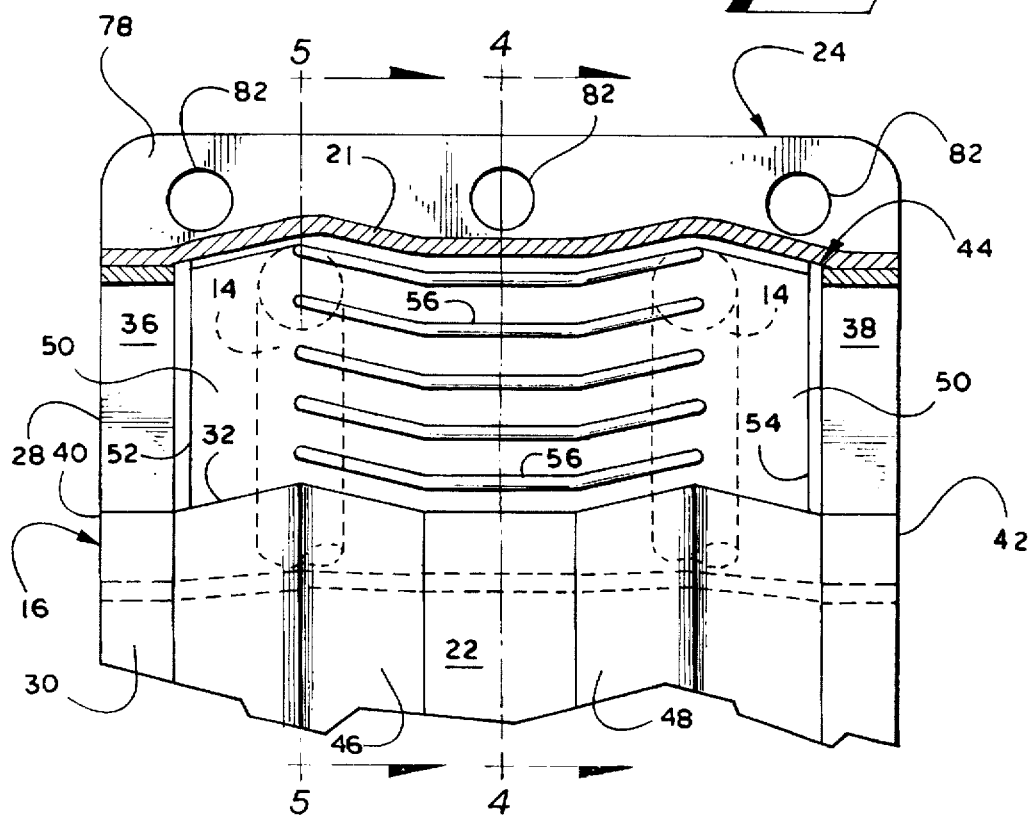
Fig_3

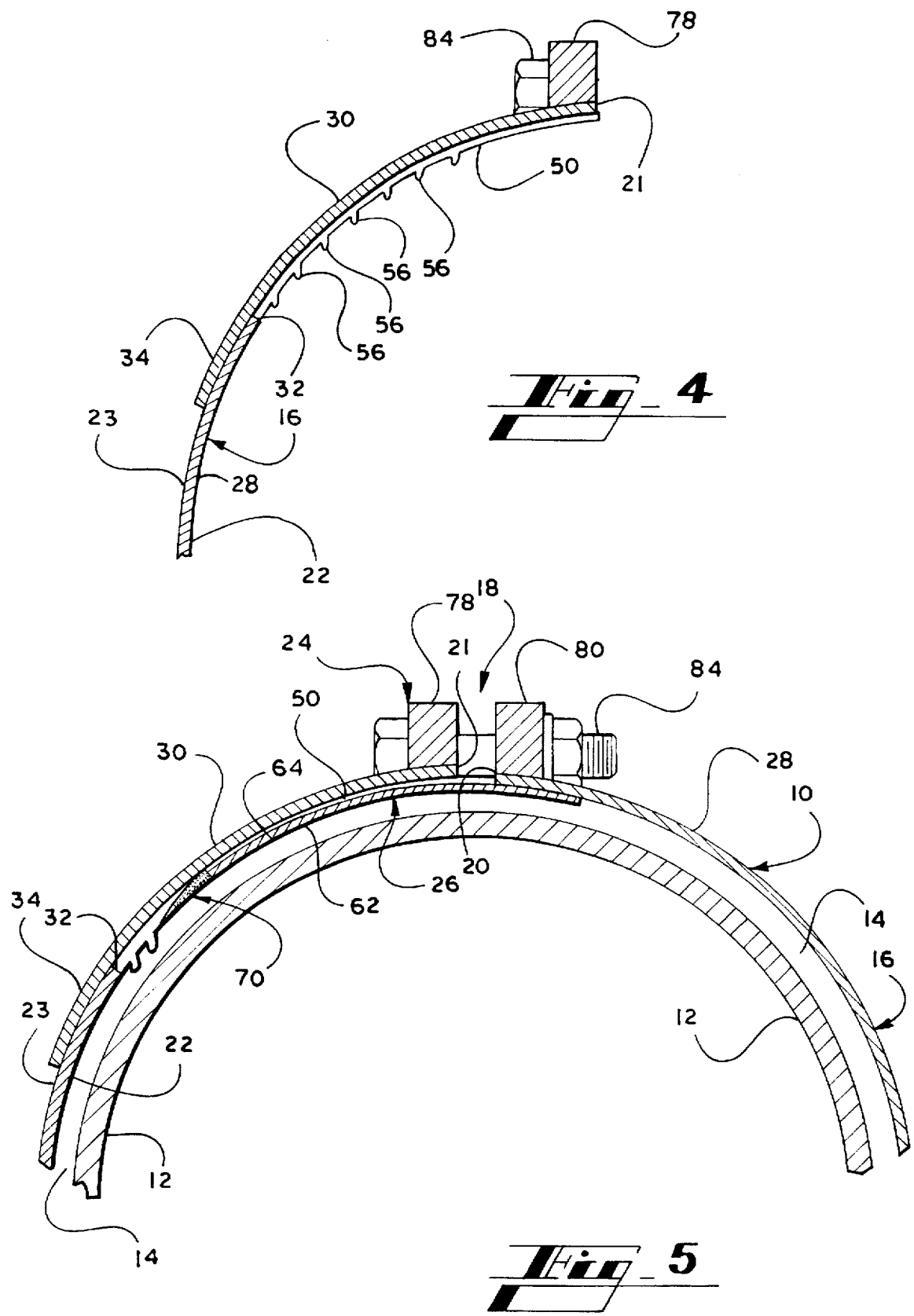

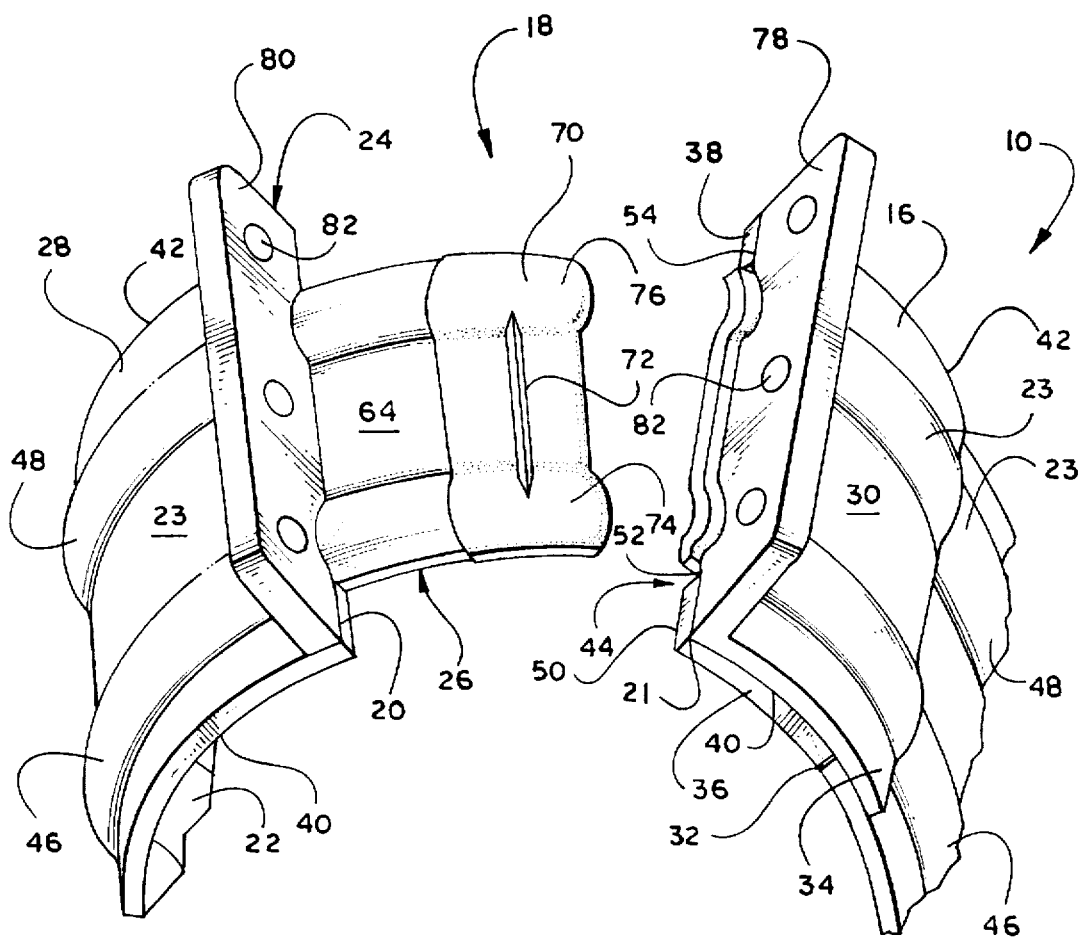
Fig_6

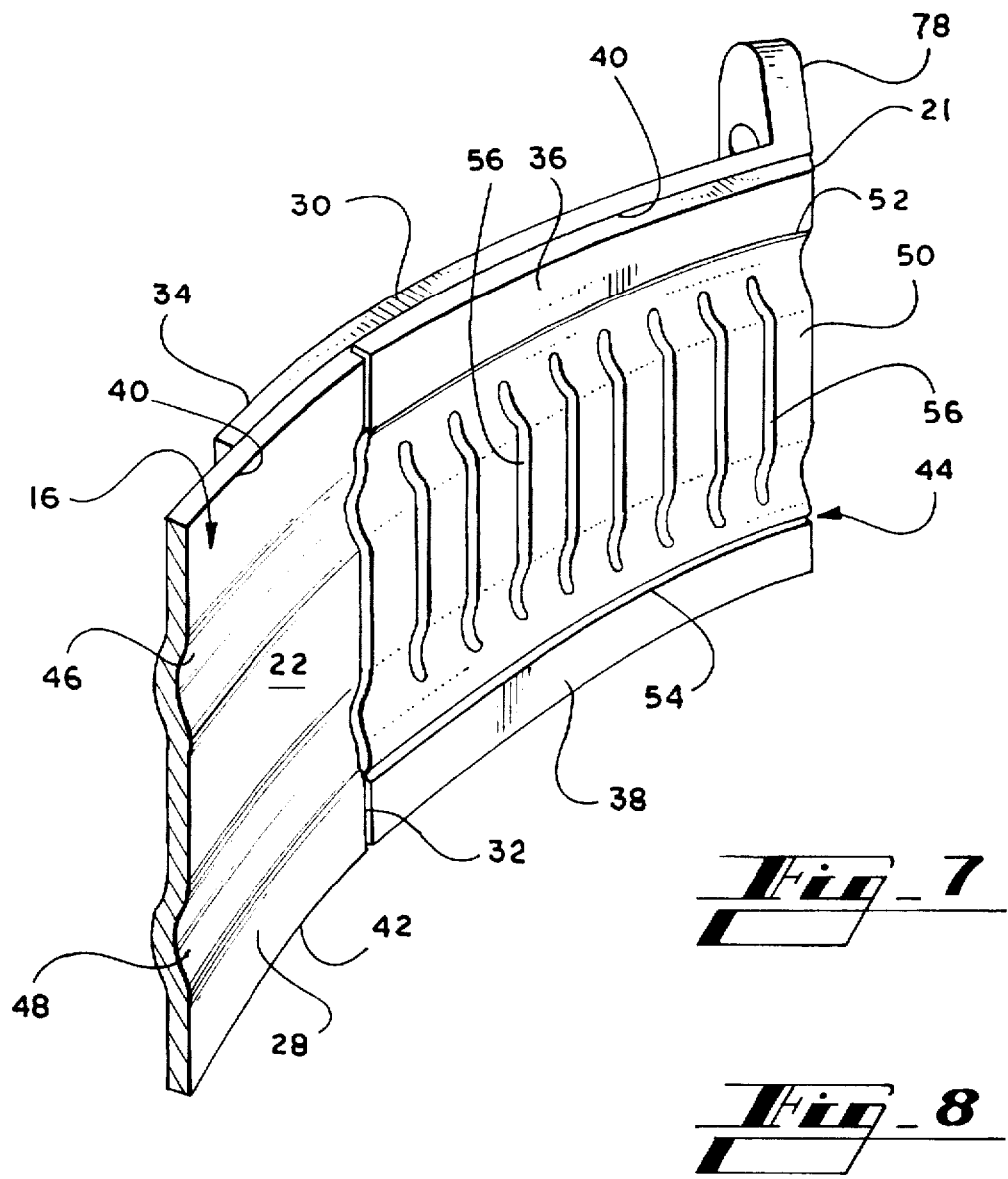
Fig_7
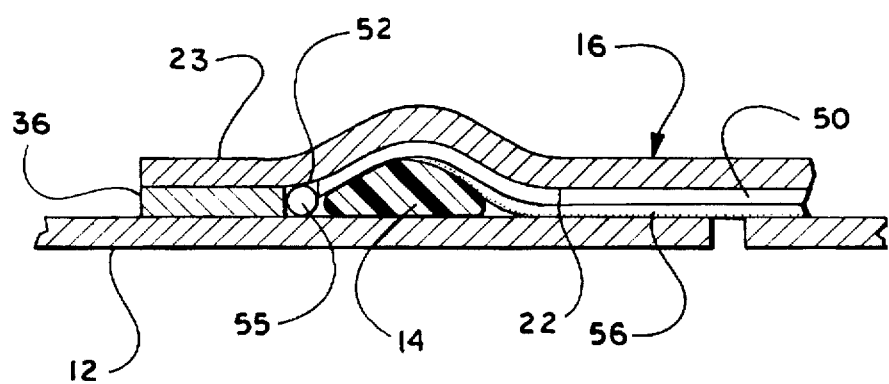
Fig_8

PIPE COUPLING REQUIRING LOW CLOSING FORCE

TECHNICAL FIELD

The present invention relates to couplings for sealing leak locations in pipes, joints between pipe sections in pipelines, or the like.

BACKGROUND OF THE INVENTION

In recent years, reliable pipe couplings of the type which clamp around the outside of a leak location in a pipe or a joint in a pipeline have been developed. An example of such a coupling is shown in U.S. Pat. No. 4,664,428. In the coupling described in this patent, a sealing plate is attached to the coupling at the axial split in the coupling. When the coupling is closed about the pipe, the sealing plate fits between the coupling and O-rings positioned on either side of the leak location. A simple closure mechanism closes the coupling's axial split and puts pressure on the O-rings as well as on gasket material on the sealing plate. When sufficient pressure is applied, all gaps are closed and fluid cannot escape past the sealing plate and out through the axial split.

If the pipe or pipeline is made of a relatively thin metal, Fiberglass, or plastic, the pipe material may tend to deform when pressure is applied to close and seal the coupling. Deformation occurs primarily because the sealing plate provides an extra layer of material that prevents the coupling from assuming its cylindrical manufactured shape as the coupling is tightened about the cylindrical pipe. This problem sometimes is avoided in couplings which include annular shoulders at the outer ends of the coupling. Such shoulders, designed to engage protrusions on the pipe to prevent slipping of the coupling, also elevate the coupling above the pipe's outer surface, creating space for the sealing plate. However, it is not practical to add such shoulders to couplings in many applications.

Thus, there is a need for a coupling which can lie essentially flush against a pipe surface and can be sealed with less force so as to avoid deformation of the pipe material caused by compression on a sealing plate.

SUMMARY OF THE INVENTION

The present invention solves the above described problems by providing a pipe coupling for sealing a leak location in a pipe or pipeline comprising a first axial sealing pad disclosed in a recess in an annular coupling member and a second axial sealing pad attached to a sealing plate, the first and second sealing pads being arranged so that when the coupling is closed about a pipe or pipeline, an axial seal is created between the first and second axial sealing pads. A seal is more easily created between the first and second axial sealing pads than would be effected between one such sealing pad and a nonpadded surface of the coupling. In addition, the recess in the coupling member allows the first axial sealing pad to be attached to the coupling member without creating a thicker coupling at the axial seal. Accordingly, the coupling can be closed and a seal can be effected without forcing the coupling and the underlying pipe or pipeline into an out-of-round shape. Consequently, less force is required to effect a seal with the coupling of the present invention than with the above-described previously developed coupling.

More particularly, the coupling of the present invention is suited for sealing a leak location in a pipe or pipeline by compressing against the pipe or pipeline a pair of annular gasket members fitted about the pipe or pipeline on opposite sides of the leak location. The annular coupling member of the coupling of the present invention has an inwardly facing inner surface, and outwardly facing outer surface, and an axial split defined by first and second axial edges. The annular coupling includes a first portion and a second portion. The first portion extends from the first axial edge to an axial shoulder which extends outwardly or radially to the second portion. The second portion of the coupling member extends from the axial shoulder to the second axial edge of the coupling member to form an inwardly facing recess in the annular coupling member extending from the axial shoulder to the second axial edge of the coupling member.

The coupling of the present invention also includes a joining or closure device for joining the first and second axial edges of the coupling member so that the coupling can be closed to compress the annular gaskets against the pipe or pipeline and effect a seal about the leak location.

The first axial sealing pad is disposed in the inwardly facing recess and is attached to the inner surface of the coupling member along the second portion of the coupling member. The coupling member further includes a sealing plate fixed to the first portion of the coupling member adjacent the first axial edge of the coupling member. The sealing plate extends from the first axial edge of the coupling member toward the second axial edge of the coupling member to a third axial edge so that, when the coupling is closed, the sealing plate compresses the annular gasket members and extends across the axial split and between the axial sealing pad and the pipe or pipeline. The sealing plate has an inwardly facing inner surface and an outwardly facing outer surface and the second axial sealing pad is attached to the outer surface of the sealing plate. The second axial sealing pad extends between the annular gasket members when the coupling is closed so that the first axial sealing pad is pressed against the second axial sealing pad when the coupling is closed for creating an axial seal and preventing passage of fluid from between the annular gasket members to the outer surface of the coupling member through the axial split in the coupling member.

More particularly, the annular coupling member of the coupling of the present invention desirably comprises a pair of arcuate shoulders extending inwardly from the inner surface of the second portion of the coupling member along respective annular edges of the second portion. The inwardly facing recess is thus bounded on three sides by the arcuate shoulders and the axial shoulder.

Still more particularly, the first axial sealing pad of the coupling of the present invention includes at least one axial rib extending inwardly from the first axial sealing pad for forming a fluid seal between the first and second axial sealing pads when the coupling is closed. More desirably, the first axial sealing pad includes a plurality of such axial ribs and the ribs extend from the first axial sealing pad at an acute angle toward the axial shoulder. Furthermore, the second axial sealing pad desirably includes an axial rib extending outwardly from the second axial sealing pad for forming a fluid seal between the first and second axial sealing pads when the coupling is closed.

The first and second axial sealing members are desirably made of rubber and the coupling member and sealing plate are desirably made of metal. The coupling of the present invention is particularly suited for use with easily deformable pipes such as thin metal pipes, fiberglass pipes, and plastic pipes such as polyethylene pipes because of the low level of force required to close the coupling and create a fluid-tight seal.

Thus, an object of the invention is to provide an improved apparatus for sealing leak locations in pipes and pipelines.

Another object of the invention is to provide a coupling for use with easily deformable pipes such as thin metal pipes, fiberglass pipes, and plastic pipes.

A further object of the invention is to provide a coupling for sealing a leak location in a pipe or pipeline with a low level of force applied by the coupling to the pipe or pipeline.

Still another object of the invention is to provide a coupling for sealing a leak location in an easily deformable pipe or pipeline carrying relatively high pressure fluid.

Other objects, features and advantages of the invention will become apparent from the following detailed description of embodiments of the invention, when taken in conjunction with the accompanying drawings and claims.

BRIEF DESCRIPTION OF THE DRAWINGS

FIG. 1 is a perspective view of an embodiment of a pipe coupling of the present invention.

FIG. 2 is a partial plan view of the coupling shown in FIG. 1 illustrating the inner surface of the first axial sealing pad.

FIG. 3 is a partial perspective view of the coupling shown in FIG. 1 illustrating the first axial sealing pad.

FIG. 4 is a partial sectional elevation view of the coupling shown in FIG. 1 illustrating the first axial sealing pad and the associated portion of the annular coupling member.

FIG. 5 is a partial sectional elevation view of the coupling shown in FIG. 1 illustrating the interior of the coupling as the coupling is fitted about a pipe. FIG. 5 is taken along lines 5—5.

FIG. 6 is a partial perspective view of the coupling shown in FIG. 1 illustrating the closure plate and the second axial sealing pad.

FIG. 7 is a partial perspective view of the coupling shown in FIG. 1 illustrating the first axial sealing pad.

FIG. 8 is a partial cross-sectional elevation view of an embodiment of the invention mounted to a pipe having a retaining ring welded to the pipe.

DETAILED DESCRIPTION OF THE PREFERRED EMBODIMENT

Referring now in more detail to the drawings, in which like numerals refer to like parts throughout the several views, FIG. 1 shows a pipe coupling 10 according to an embodiment of the present invention. As best shown in FIG. 5, the pipe coupling 10 fits about a pipe 12 or pipeline for sealing a leak location such as the gap between adjoining pipes in a pipeline. The pipe coupling 10 fits over a pair of annular gasket members 14 which are fitted about the pipe 12 or pipeline on opposite sides of the leak location. Suitable annular gasket members are rubber O-rings.

The pipe coupling 10 comprises an annular coupling member 16 having an axial split 18 defined by first and second axial edges 20 and 21. The axial split 18 allows the pipe coupling to be opened and fitted about the pipe 12 or pipeline. The pipe coupling 10 has an inwardly facing inner surface 22 and an outwardly facing outer surface 23. The inner surface 22 of the pipe coupling 10 faces the pipe 10 or pipeline when the pipe coupling is fitted about the pipe or pipeline and contacts the annular gasket members 14. The pipe coupling 10 further comprises a joining or closure device 24 for joining the first and second axial edges 20 and 21 of the annular coupling member 16 and closing the pipe coupling until the coupling fits snugly against the pipe 12 or pipeline. The pipe coupling 10 also includes a sealing plate 26 for sealing the axial split 18 in the annular coupling member 16.

The pipe coupling includes a first portion 28 and second portion 30. The first portion 28 of the annular coupling member 16 extends from the first axial edge 20 to an axial shoulder 32 which extends outwardly to the second portion 30. The second portion 30 of the annular coupling member 16 overlaps the first portion 28 of the annular coupling member proximate the axial shoulder 32 and extends from the axial shoulder to the second axial edge 21 of the annular coupling member. The second portion 30 of the annular coupling member 16, best shown in FIGS. 1 and 6, is welded to the first portion 28 of the annular coupling member proximate the axial shoulder 32; however, it should be understood that the axial shoulder 32 can also be formed by forming a single integral piece into the annular coupling member, such as by stamping the piece with a die.

The term "axial" used herein means in the direction of the longitudinal axis of the coupling 10. The longitudinal axis of the coupling 10 passes through the center of the circle formed by the annular coupling member 16. When the pipe coupling 10 is installed about a pipe or pipeline, the longitudinal axis of the pipe coupling is substantially aligned with the longitudinal axis of the pipe or pipeline. The term "outwardly" as used herein means radially with respect to the longitudinal axis of the pipe coupling 10 and away from the longitudinal axis of the pipe coupling. In other words, "outwardly" as used herein means in a direction substantially perpendicular and away from the longitudinal axis of the pipe coupling 10. Likewise, the term "inwardly" as used herein means radially with respect to the longitudinal axis of the pipe coupling or substantially perpendicular to the longitudinal axis of the pipe coupling and in a direction toward the longitudinal axis of the pipe coupling.

As best shown in FIGS. 2 and 3, the annular coupling member 16 further comprises a pair of arcuate shoulders 36 and 38 extending inwardly from the inner surface 22 of the first portion 28 of the coupling member 16 along respectively annular edges 40 and 42 of the first portion. The inner surface 22 of the second portion 30 of the coupling member 16, the axial shoulder 32, and the arcuate shoulders 36 and 38 define an inwardly facing recess 44 in the annular coupling member extending from the axial shoulder to the second axial edge 21.

The annular coupling member 16 defines a pair of annular gasket grooves 46 and 48 spaced from one another for receiving the annular gasket members 14 when the coupling 10 is fitted about a pipe or pipeline. The annular gasket grooves 46 and 48 extend outwardly from the inner surface 22 of the annular coupling member 16 and extend along the first and second portions 28 and 32 of the annular coupling member from the first axial edge 20 to the second axial edge 21.

As best shown in FIGS. 2–4 and 7, a first axial sealing pad 50 is disposed in the inwardly facing recess 44 of the second portion 30 of the annular coupling member 16. The first axial sealing pad 50 is attached to the inner surface 22 of the second portion 30 with means such as an adhesive. The first axial sealing pad 50 has a substantially rectangular layout and conforms to the contour of the coupling member inner surface 22. The first axial sealing pad 50 extends from the axial shoulder 32 along the inner surface 22 of the second portion 30 of the annular coupling member 16 to the second axial edge 21. The first axial sealing pad 50 may slightly overlap the axial shoulder 32 but should be substantially flush with the first portion 28 of the annular coupling member 16. The first axial sealing pad 50 is desirably made of rubber, preferably molded rubber having a durometer hardness from about 40 to about 80.

The first axial sealing pad 50 is spaced from the arcuate shoulders 36 and 38 of the annular coupling member 16 to form channels 52 and 54 between the first axial sealing pad and the arcuate shoulders. The channels 52 and 54 can be useful to receive retaining rings 55 welded to the pipe 10 in some applications as illustrated in FIG. 8.

The first axial sealing pad 50 also includes a plurality of axial ribs 56 spaced from and substantially parallel to one another and extending inwardly from the first axial sealing pad. As will be explained further below, the axial ribs 56 assist in forming a fluid seal. Desirably, as shown in FIG. 4, the axial ribs extend inwardly from the first axial sealing pad 50 at an acute angle toward the axial shoulder 32. The angle of the axial ribs 56 enhances the fluid seal created in part by the first axial sealing pad 50 because the ribs are angled against the direction of the force applied by fluid within the pipe or pipeline. Thus, to dislodge the ribs 56 and form a leak path, the fluid in the pipe or pipeline would have to bend the ribs in the opposite direction from which the ribs are angled. This would require a large amount of force. The axial ribs 56 extend from one annular gasket member 14 to the other annular gasket member when the coupling 10 is closed about a pipe or pipeline.

As best shown in FIGS. 1, 5, and 6, the sealing plate 26 of the pipe coupling 10 is fixed to the first portion 28 of the annular coupling member 16 adjacent the first axial edge 20 and extends from the first axial edge toward the second axial edge 21 to a third axial edge 60. The sealing plate 26 has an inwardly facing inner surface 62 and an outwardly facing outer surface 64. The outer surface 64 of the sealing plate 26 is attached to the inner surface 22 of the annular coupling member 16 proximate the first axial edge 20 with means such as welding. The sealing plate also has a pair of arcuate grooves 66 and 68 corresponding to the annular gasket grooves 46 and 48 in the annular coupling member 16. When the coupling 10 is closed about a pipe or pipeline, the sealing plate 26 compresses the annular gasket members 14 and extends across the axial split 18 of the annular coupling member 16 and between the first axial sealing pad 50 and the pipe or pipeline. The sealing plate 26 extends from one of the annular gasket members 14 to the other when the pipe coupling 10 is in place about a pipe or pipeline.

A second axial sealing pad 70 is attached to the outer surface 64 of the sealing plate 26 and extends between the annular gasket members 14 when the pipe coupling 10 is closed so that the first axial sealing pad 50 is compressed against the second axial sealing pad when the coupling is closed for preventing passage of fluid from between the annular gasket members to the outer surface 23 of the coupling member 16 through the axial split 18. The second axial sealing pad 70 is desirably attached to the outer surface 64 of the sealing plate 26 proximate the third axial edge 60 of the sealing plate and extends across the entire width of the sealing plate from one arcuate groove 66 to the other 68. The second axial sealing pad 70 also includes an axial rib 72 extending outwardly from the second axial sealing pad for enhancing the fluid seal between the first axial sealing pad 50 and the second axial sealing pad when the coupling 10 is closed. The axial rib 72 of the second axial sealing pad 70 extends from one arcuate groove 66 of the sealing plate 26 to the other arcuate groove 68 of the sealing plate. The second axial sealing pad 70 has projecting portions 74 and 76 where the second axial sealing pad extends over the arcuate grooves 66 and 68 of the sealing plate 26 along the outer surface 64 of the sealing plate.

The second axial sealing pad 70, like the first axial sealing pad 50, is desirably made of rubber and is preferably made of molded rubber having a durometer hardness of 40 to 80.

The adjoining or closure device 24 of the pipe coupling 10 comprises a pair of closure plates or flanges 78 and 80 extending outwardly from the annular coupling member 16 along the first and second axial edges 20 and 21, respectively. The closure plates 78 and 80 are mounted to the annular coupling member 16 by means such as welding. Each of the closure plates 78 and 80 have three holes 82 for receiving bolts 84 which are used to join the closure plates together, thereby joining the first and second axial edges 20 and 21 of the coupling member 16; however, it should be understood that wider couplings may have more than three bolts fastening the closure plates. The holes in the closure plates 78 and 80 are larger than the diameter of the bolts 84 so that the bolts can be inserted through the holes while the pipe coupling 10 is still open and the closure plates are spaced from and at an angle from one another. Alternatively, clamps or any other appropriate means for joining the axial edges 20 and 21 of the annular coupling member 16 can be used. In addition, clamps or the like can be used instead of bolts to hold the closure plates 78 and 80 together.

The construction of the components of the pipe coupling 10 can vary as is understood by those skilled in the art. The material for such components must not be subject to significant corrosion by the substance within the pipeline, and some pipelines must be resistant to deterioration caused by the external environment such as water, a corrosive atmosphere, the weather, or other particular environment. Carbon and stainless steel are preferred for most applications. The preferred thickness of the components varies with the diameter of the coupling and the pressure within the pipeline.

Installation of the pipe coupling 10 is apparent from the foregoing description. The annular gasket members 14 are fitted about the leak location in a pipe or pipeline and the coupling is fitted about the pipe or pipeline and over the annular gasket members. The annular gasket grooves 46 and 48 of the annular coupling member 16 are positioned over the annular gasket members 14 and the closure plates 78 and 80 are brought together to compress the annular gasket members. The bolts 84 are fitted through the holes 82 in the closure plates 78 and 80 and fastened until the desired seal is obtained.

When the coupling 10 is closed, the sealing plate 26 extends across the axial split 18 and between the second portion 30 of the annular coupling member 16 and the pipe or pipeline. In addition, the first axial sealing pad 50 is compressed against the second axial sealing pad 70 attached to the sealing plate 26. The axial ribs 56 of the first axial sealing pad 50 are compressed against the second axial sealing pad 70 and the axial rib 72 of the second axial sealing pad is pressed against the first axial sealing pad to create an axial fluid seal extending between the sealing plate 26 and the coupling member 16 and between the two annular gasket members 14. This axial seal prevents fluid within the pipeline from passing outwardly from between the annular gasket members 14 to the outer surface 23 of the annular coupling 16 through the axial split 18. Because the axial seal is created between deformable first and second axial sealing pads 50 and 70 and the first axial sealing pad 50 fits within the recess 44 in the coupling member 16, the axial seal can be created with less torque imparted to the bolts 84 and less stress on the pipe or pipeline. A suitable seal can be formed between the deformable first and second axial sealing pads 50 and 70 more easily than could a seal be formed between one of the deformable sealing pads and a metallic surface. In addition, an axial seal is more easily formed with the first axial sealing pad 50 in the coupling member recess 44 than with a sealing pad simply attached to the inner surface of the coupling member without a recess because in the former instance, the components of the axial seal can be compressed together without the coupling member being forced out-of-round, whereas in the latter situation, the additional bulk of the sealing pad would require that the coupling member be forced into an out-of-round shape to create a complete seal. Thus, the pipe coupling 10 described hereinabove can be sealed with less force so as to avoid deformation of the pipe or pipeline.

Those skilled in the art will understand that the coupling of the present invention is not limited to an embodiment having a single axial split in a single closure device. Instead, the coupling can be made with two semicylindrical halves so that there would be two axially splits and two sets of closure plates. The details of such a pipeline will be understood by those skilled in the art in view of the above described embodiment.

The foregoing description relates only to an embodiment of the present invention, and numerous changes and modifications may be made therein without departing from the scope of the invention as defined in the following claims.

I claim:

1. A coupling for sealing a leak location in a pipe or pipeline by compressing against the pipe or pipeline a pair of annular gasket members fitted about the pipe or pipeline on opposite sides of the leak location, the coupling comprising:

an annular coupling member having an inwardly facing inner surface, an outwardly facing outer surface, and an axial split defined by first and second axial edges, the annular coupling comprising a first portion and a second portion, the first portion extending from the first axial edge to an axial shoulder which extends radilly outwardly to the second portion, the second portion extending from the axial shoulder to the second axial edge to form an inwardly facing recess in the annular coupling member extending from the axial shoulder to the second axial edge, means for joining the first and second axial edges so that the coupling can be closed and compress the annular gaskets against the pipe or pipeline;

a first axial sealing pad disposed in said recess and attached to the inner surface of the coupling member along the second portion;

a sealing plate fixed to the first portion of the coupling member adjacent the first axial edge and extending from the first axial edge toward the second axial edge to a third axial edge so that, when the coupling is closed, the sealing plate compresses the annular gasket members and extends across the axial split and between the first axial sealing pad and the pipe or pipeline, the sealing plate having an inwardly facing inner surface and an outwardly facing outer surface; and a second axial sealing pad attached to the outer surface of the sealing plate and extending between the annular gasket members when the coupling is closed so that the first axial sealing pad is compressed against the second axial sealing pad when the coupling is closed for preventing passage of fluid from between the annular gasket members to the outer surface of the coupling member through the axial split.

2. A coupling as in claim 1 wherein the annular coupling member further comprises a pair of arcuate shoulders extending inwardly from the inner surface of the second portion along respective annular edges of the second portion and wherein said inwardly facing recess is bounded on three sides by said arcuate shoulders and said axial shoulder.

3. A coupling as in claim 2 wherein the first axial sealing pad is spaced from the arcuate shoulders to form channels between the first axial sealing pad and the arcuate shoulders.

4. A coupling as in claim 1 wherein the second axial sealing pad includes an axial rib extending outwardly from the second axial sealing pad for forming a fluid seal between the first and second axial sealing pads when the coupling is closed.

5. A coupling as in claim 1 wherein the first axial sealing pad includes at least one axial rib extending inwardly from the first axial sealing pad for forming a fluid seal between the first and second axial sealing pads when the coupling is closed.

6. A coupling as in claim 5 wherein the axial rib of the first axial sealing pad extends from the first axial sealing pad at an acute angle toward the axial shoulder.

7. A coupling as in claim 5 wherein the axial rib extends from one annular gasket member to the other annular gasket member when the coupling is closed.

8. A coupling as in claim 5 wherein the second axial sealing pad includes an axial rib extending outwardly from the second axial sealing pad for forming a fluid seal between the first and second axial sealing pads when the coupling is closed.

9. A coupling as in claim 1 wherein the first axial sealing pad includes a plurality of axial ribs extending inwardly from the first axial sealing pad and spaced from one another for forming a fluid seal between the first and second axial sealing pads when the coupling is closed.

10. A coupling as in claim 9 wherein the axial ribs extend from the first axial sealing pad at an acute angle toward the axial shoulder.

11. A coupling as in claim 9 wherein the second axial sealing pad includes an axial rib extending outwardly from the second axial sealing pad for forming a fluid seal between the first and second axial sealing pads when the coupling is closed.

12. A coupling as in claim 1 wherein the coupling member defines a pair of outwardly extending annular grooves for receiving the annular gasket members and the sealing plate defines a corresponding pair of outwardly extending annular grooves for receiving the annular gasket members.

13. A coupling as in claim 1 wherein the first and second axial sealing members are made of rubber.

14. A coupling as in claim 1 wherein the first and second axial sealing members are made of rubber and the coupling member and sealing plate are made of metal.

15. A coupling as in claim 1 wherein the pipe or pipeline is a deformable fiberglass tube.

* * * * *